A. R. WORTH.
Corn Planter.
No. 63,685. Patented Apr. 9, 1867.
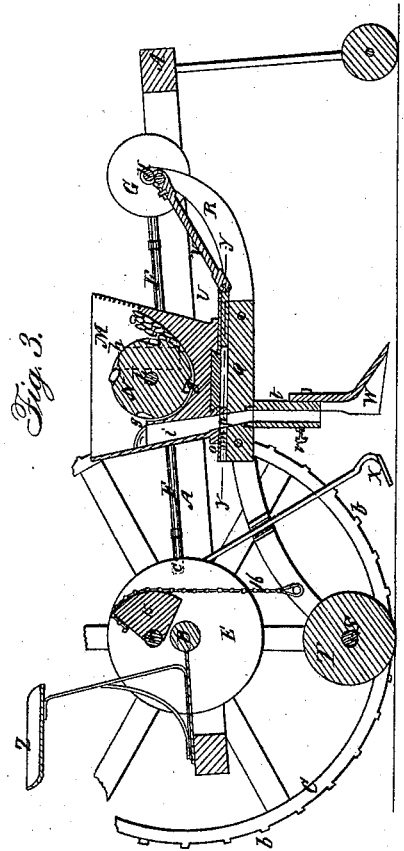
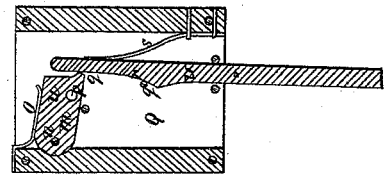
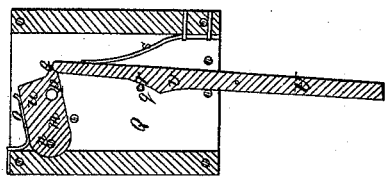
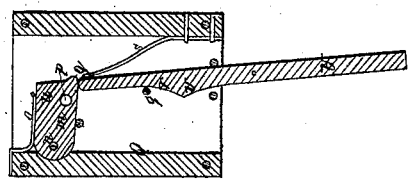
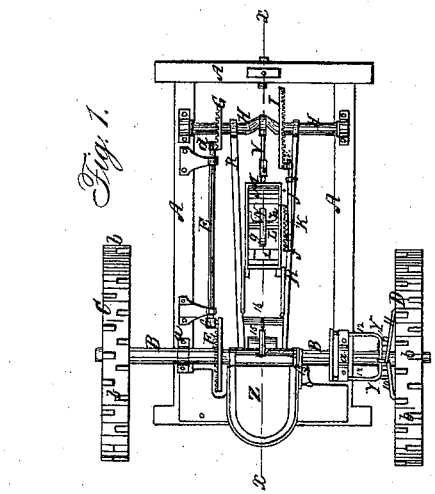
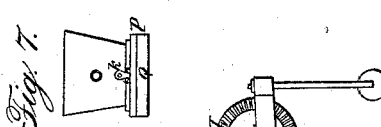
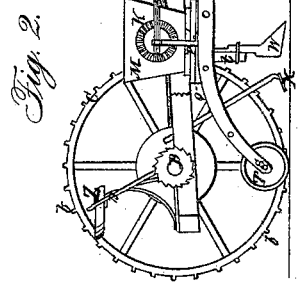
Witnesses:
Inventor:

United States Patent Office

ANDREW R. WORTH, OF NANTUCKET, MASSACHUSETTS.

Letters Patent No. 63,685, dated April 9, 1867.

IMPROVEMENT IN SEED PLANTERS.

The Schedule referred to in these Letters Patent and making part of the same.

TO ALL WHOM IT MAY CONCERN:

Be it known that I, ANDREW R. WORTH, of Nantucket, in the county of Nantucket, and State of Massachusetts, have invented certain Improvements in Seed Planters, of which the following is a full, clear, and exact description, reference being had to the accompanying drawings, making part of this specification, in which—

Figure 1 is a plan of my improved seed planter.

Figure 2 is a side elevation of the same, one of the draught-wheels being removed.

Figure 3 is a longitudinal vertical section on the line $x\,x$ of fig. 1, (enlarged.)

Figures 4, 5, and 6 are horizontal sections on the line $y\,y$ of fig. 3, representing the different positions of the mechanism by which the seed passage is opened and closed.

Figure 7, detail to be referred to.

My invention has for its object to provide a simple and reliable machine by which a determinate number of seed may be planted in hills at regular distances apart, or in drills; and my invention consists in a seed-wheel provided with seed cups, each of which contains a single seed, the number of the seed cups corresponding to the number of seed to be planted in one hill, and arranged at the required distance apart for insuring the distribution of the seed at proper intervals when sown in drills; and my invention also consists in an improved device for operating the slide which uncovers the seed passage, and in certain other details to be mentioned hereafter.

To enable others skilled in the art to understand and use my invention, I will proceed to describe the manner in which I have carried it out.

In the said drawings, A is the frame or truck, in suitable bearings, $a$, in the upper side of which, rests the shaft or axle B, on the extremities of which loosely turn the driving-wheels C D, provided with projections, $b$, for preventing them from slipping when the machine is in motion. To the shaft B is secured a bevel-wheel, E, with which engages a bevel-pinion, $c$, on one extremity of a short longitudinal shaft, F, the other extremity of which carries a bevel-pinion, $d$, which drives a bevel-wheel, G, secured to near one end of a crank-shaft, H. I is a bevel-wheel, which engages with a bevel-pinion, $e$, on one end of a short shaft, J, the other end of which carries a bevel-pinion, $f$, which drives a bevel-wheel, K, on one end of a shaft, L, which passes through and projects outside a hopper or seed receptacle, M. N is a wheel secured to the shaft L within the hopper M, and is provided with a series of cavities or cups, $g$, each of which is of a size only sufficient to contain a single seed or kernel, which is taken up by the wheel N as it revolves within the hopper or receptacle M which contains the seed. $h$ are plates attached to the inside of the hopper, and extend nearly to the opposite surfaces of the seed-wheel, and serve to retain the seed in the front portion of the hopper. Behind the revolving seed-wheel, at one end of the hopper, is formed a passage, $i$, into which the seed are deposited by the centrifugal action of the revolving seed-wheel N, the sides of the passage $i$ being rounded or tapered off to insure the delivery of the seed as intended. The bottom of the hopper or seed receptacle is dove-tailed, as seen in figs. 2 and 3, and slides on a guide of a corresponding form on the upper side of a plate, P, which encloses the device by which the seed passage is opened and closed, and which will be hereafter described. By means of the foregoing construction, the hopper may be readily removed from the machine should it be required at any time to change the kind of seed therein; and the side of the hopper is provided with a latch, $k$, which fits into a recess, thus securely holding the hopper when in a position for use. The plate P rests upon a plate, Q, of corresponding form, confined between the sides of a frame, R, the upper extremities of which fit loosely around the crank-shaft H, while their lower extremities form bearings for the shaft S, upon which turns a covering roller, T. Between the plates P and Q is placed the mechanism by the operation of which the dropping of the seed into the hill is regulated. U is a bar, (see figs. 3, 4, 5, and 6,) one end of which is rounded off and rests against the side of a block, $m$, which is pivoted at $n$, and is continually pressed in the direction of the bar U by a flat spring, $o$. An aperture, $p$, of a size corresponding to that in the bottom of the hopper M, is formed through the block $m$, and this aperture $p$ is brought immediately in line underneath that in the hopper, when the block $m$ is pressed against the resistance of the spring $o$ by the bar U in the following manner: The outer end of the bar U is attached to the end of a connecting-rod, V, which is secured to and operated by the crank on the shaft H. $q$ is a pin, against which the inclined portion $r$ of the bar U slides as it moves, the flat spring $s$ serving to keep the bar U pressed against the pin or stop $q$. To the under side of the plate Q is secured a metal tube, $t$, which conducts the seed to the place where the hill is to be formed, the required number of seed being first deposited upon the slide m at or near the point u, figs. 4 and 6, by the seed-wheel completing a single revolution, the position of the block m at this stage being that shown in fig. 4. W is a plough, which is made to fit snugly and slide upon the front of the tube t, and is secured in place thereon, after adjustment, by means of the set-screw v, the plough making the furrow into which are deposited the seed, which are then covered over by the hoes X, whose handles are secured to the sides of the frame R in such manner as to admit of their blades covering in the furrow, which is then levelled down by the covering roller T. As the bar U is thrown forward by the revolution of the crank-shaft H, the block m is pressed into the position seen in fig. 5. The seed (which were deposited at the point u being brought against the edge of the passage i) are pushed into the aperture p, which at this instant forms, with the passage i in the bottom of the hopper and the tube t, an uninterrupted and continuous opening for the passage of the seed to the point where they are to be sown. After the inner end of the bar U has pressed the slide m into the position seen in fig. 5, it passes by the corner 9 of the block m, as seen in fig. 6, when the block is instantly returned by the spring o to its original position, as seen in fig. 4, closing the seed passage, as required. After the machine travels over the ground a distance equal to that determined on for the distance between two hills the seed-wheel will have made another complete revolution, and the exact number of seed required will be collected and deposited, as previously described, in the furrow made by the plough, after which the earth is scraped over them by the action of the hoes X, and is rolled down by the roller T. The gearing by which the mechanism for opening and closing the seed passage is regulated may be instantly disconnected from the driving or draught-wheel D by the following means: 10 is a pawl, one end of which is pivoted to the draught-wheel D, while its other end is kept, by a bent spring, 11, in contact with a ratchet-wheel, Y, which is snugly fitted upon an enlargement of the driving-shaft or axle, B, and is attached to a frame, 12, which is also fitted snugly thereto, by which construction the ratchet Y may be slid back from contact with the pawl 10, and the driving-wheel may revolve without operating the machinery by which the seed are sown. The frame R, to which the plough W, hoes X, and roller T are attached, may be raised from the ground, when going to or returning from the field, or to avoid any obstacle, by simply throwing down by hand a lever, 13, on one end of a shaft, 14, which carries a segment or disk, 15, having one end of a chain, 16, secured thereto, the other end of the chain being fastened to near the lower end of the frame R. Z is the seat which is occupied by the driver when the machine is in motion. The bevel-wheel E may have more than one circle of teeth, or may be replaced by one of a different size, in order that the speed of the seed-wheel and operation of planting the seed may be regulated to suit the requirements of the locality to be planted.

A hand machine for planting in drills may be so constructed as to embrace the principal features of my invention, in which case, however, it will be necessary to dispense with the block m.

Instead of making the seed-wheel in one piece it may be made in sections, so that the number of cups, and consequently the number of seed, may be varied, if desired, without removing the seed-wheel itself.

It will be seen that a seed-wheel constructed as above described is particularly applicable for planting corn, etc., as each cup is of the exact size to take up but one seed at a time, which is deposited upon the block m until the wheel N has made an entire revolution, when the block is suddenly vibrated to one side, and the required number of seeds collected thereon, is passed at once down the seed tube t into the hill, and the passage P is then instantly closed, as previously described, whereas, in planters of the ordinary construction, the cylinder or wheel takes up several seed at a time and deposits them while revolving, one after another, as is customary when sowing in drills.

Claim.

What I claim as my invention, and desire to secure by Letters Patent, is—

1. A seed-wheel, N, provided with a number of cups exactly corresponding to the number of seed required to be planted in a single hill, or so placing the cups at such a distance apart as will regulate the required distance of the seed from each other when planted in a drill.

2. I also claim the block m with its spring o, in combination with the bar U, with its spring s, inclined portion r, and stop q, operating substantially as and for the purpose set forth.

3. I also claim a hopper or seed receptacle, M, with its partitions or plates h, and having its opening i to the seed passage, constructed substantially as above described, in combination with a revolving seed-wheel, N, provided with a number of seed cups, g, equal to the number of seed to be planted in a hill, substantially as set forth.

4. I also claim a hopper or seed receptacle, M, made removable, in the manner and for the purpose set forth.

5. I also claim the hoes X and roller T, in combination with the frame R, arranged and operating substantially as and for the purpose set forth.

ANDREW R. WORTH.

Witnesses:
F. C. SANFORD,
ANDW. WHITNEY.